Patented May 17, 1949

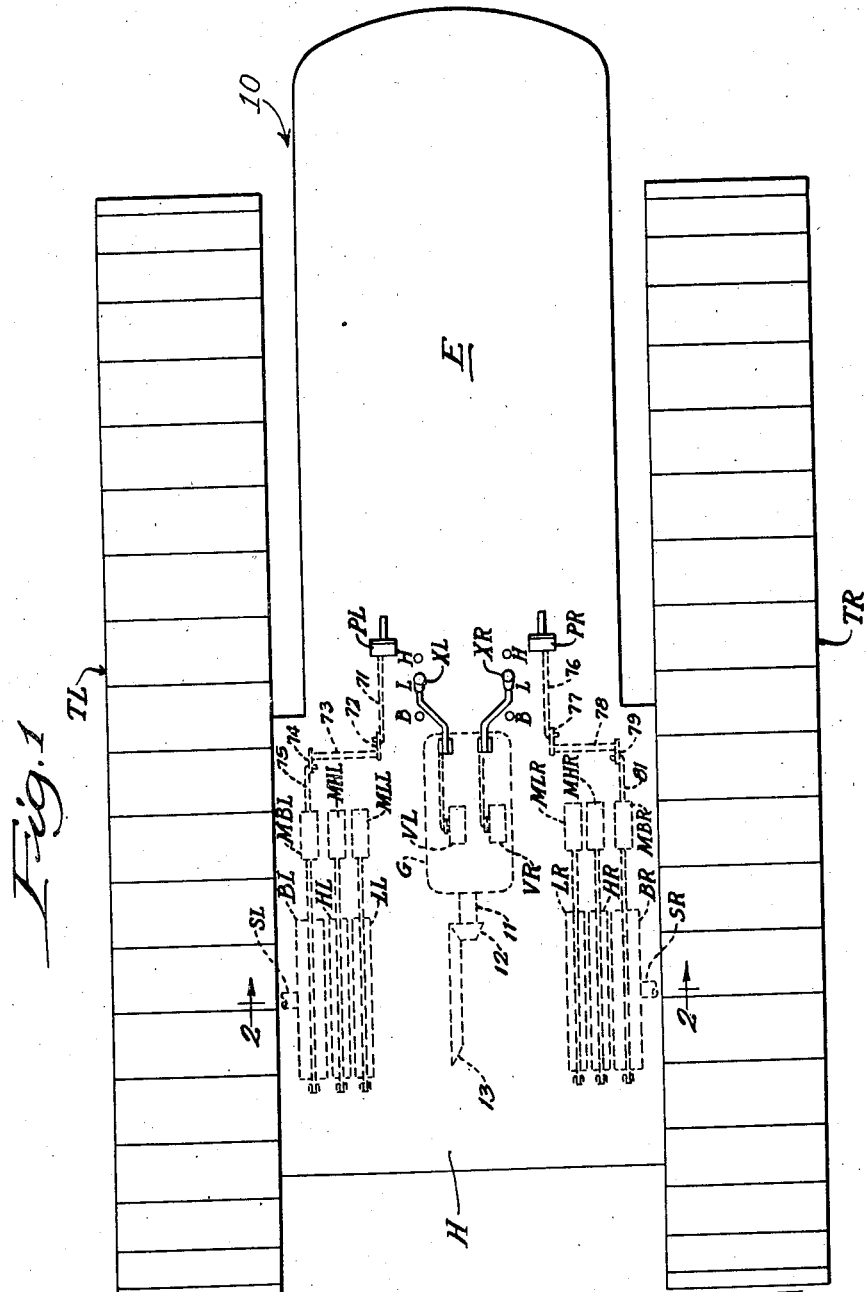

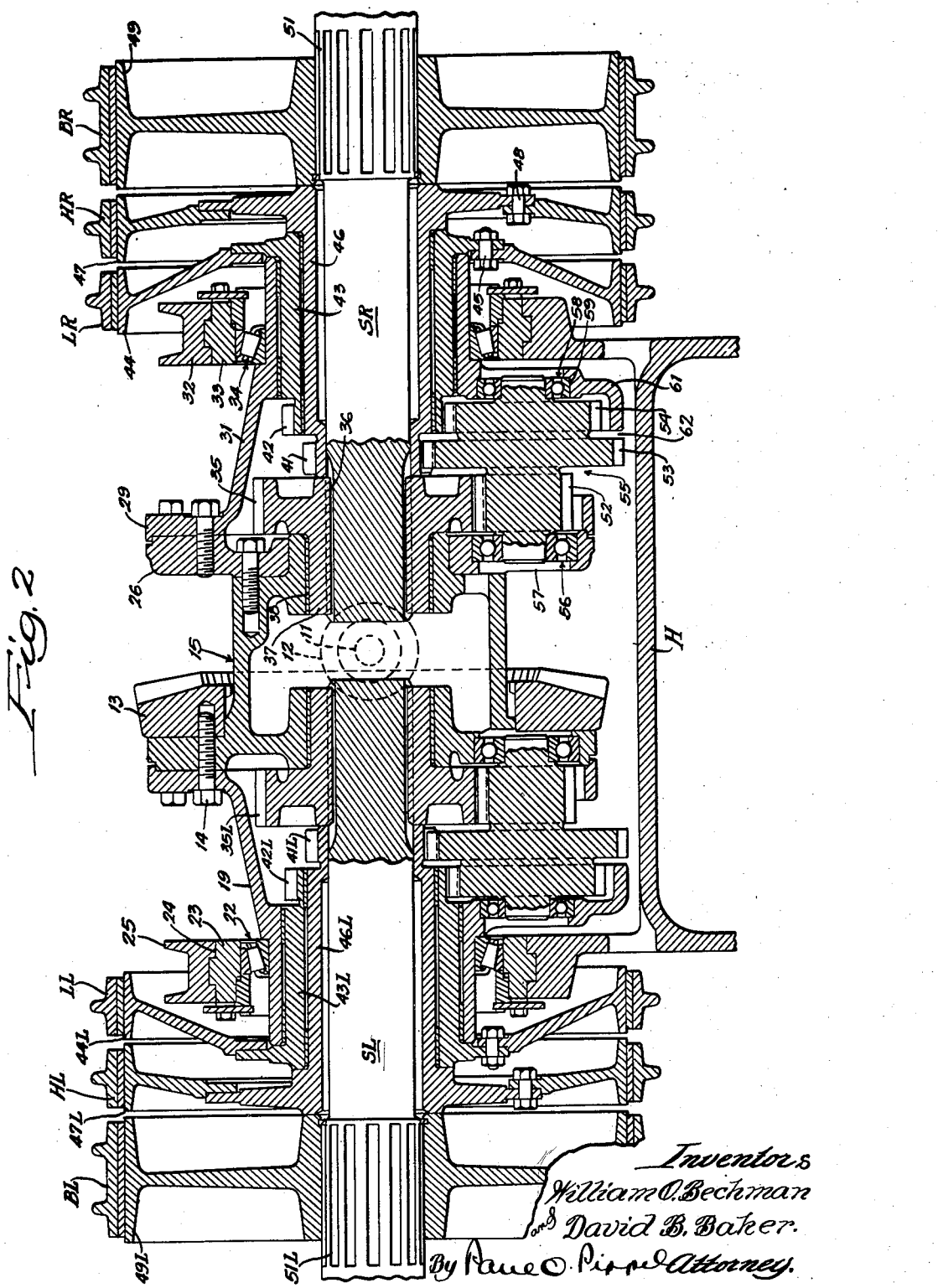

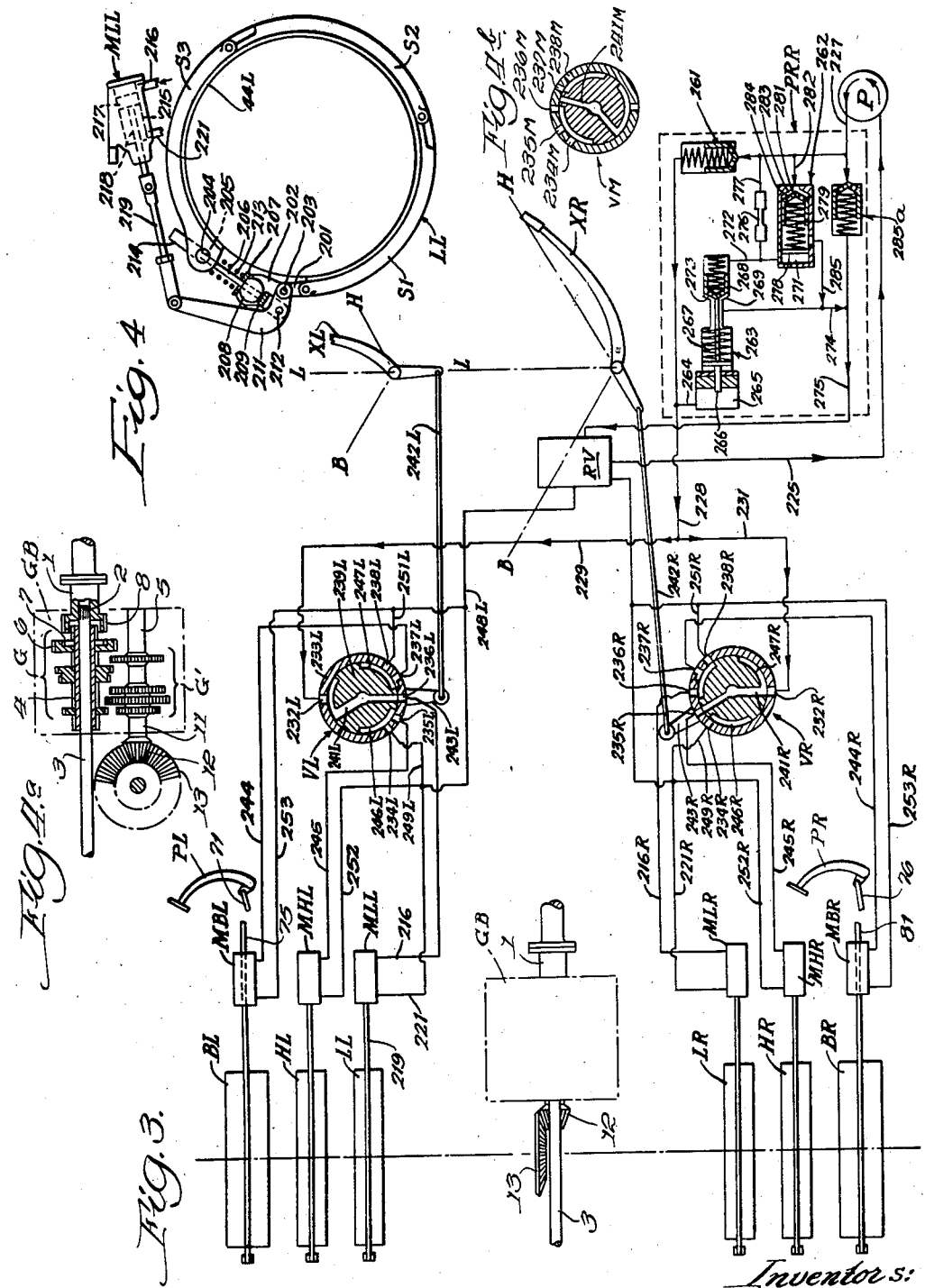

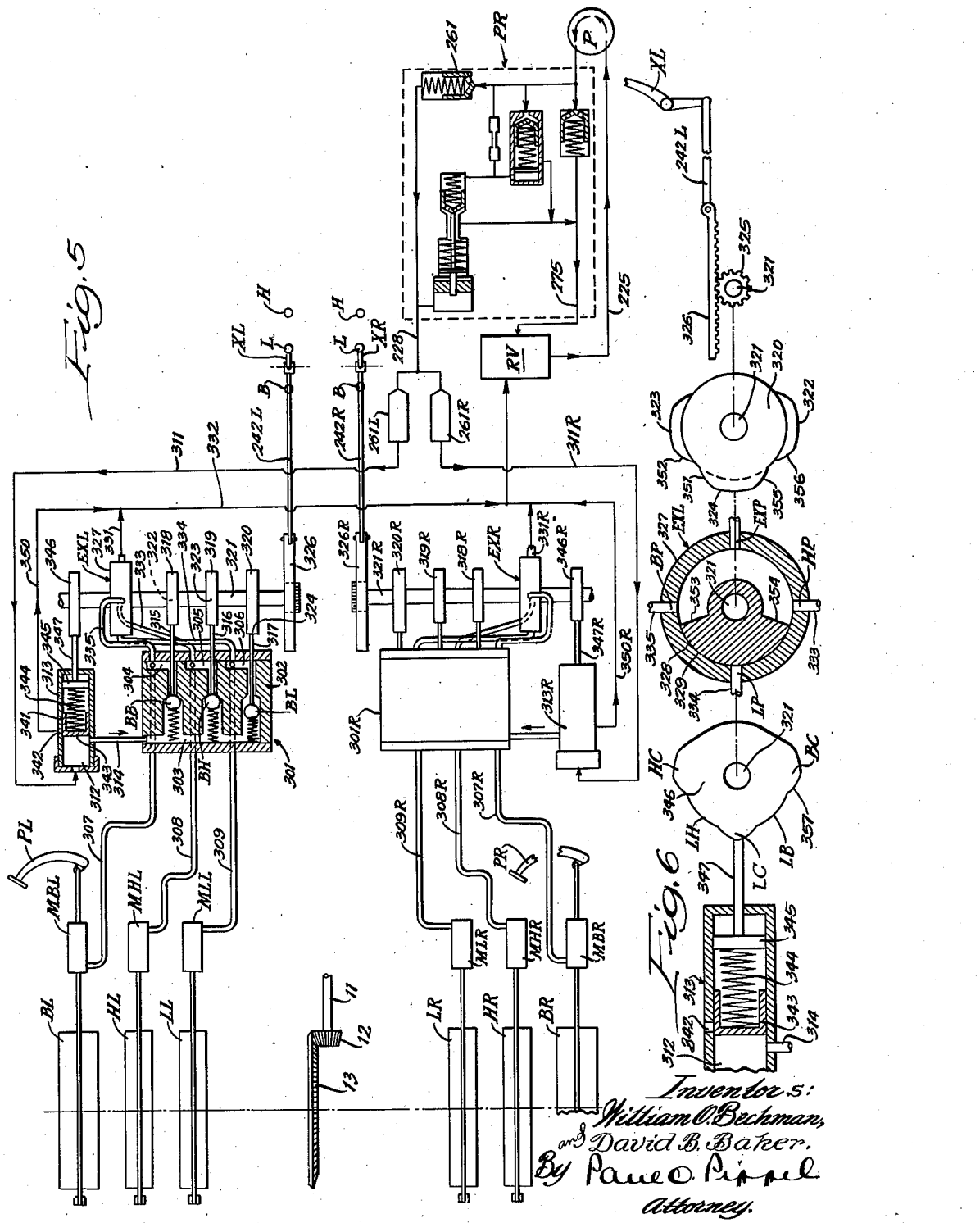

2,470,209

UNITED STATES PATENT OFFICE 2,470,209

FLUID CONTROLLED VEHICLE CHANGE-SPEED STEERING APPARATUS

William O. Bechman, Chicago, and David B. Baker, Riverside, Ill., assignors to International Harvester Company, a corporation of New Jersey Application October 8, 1945, Serial No. 620,894

8 Claims. (Cl. 180—9.2)

This application is a continuation-in-part of application Serial No. 566,439, filed December 4, 1944, now abandoned.

This invention relates to vehicles such as crawler tractors having propelling traction units varied in relative speed to determine the course of the vehicle, and more specifically the invention concerns improvements in controls for selecting the speeds of said units.

The general object of this invention is the provision of a steering control system utilizing fluid-actuated motors for incurring the driving relation of the transmission power trains and the braking relation of brake devices with the traction units with a positiveness which is a function of fluid pressure imposed upon the motors pertaining to said trains and brake devices, and means for temporarily diminishing this pressure during concurrent impression thereof onto motors with respect to which individual pressure imposition is being shifted from one to the other.

Other desirable and more specific objects, capabilities, and advantages inherent in and encompassed by the invention will be more fully comprehended after reading the ensuing description and examining the annexed drawings, wherein:

Figure 1 is a plan view of a crawler type tractor including change-speed driving and steering gear constituting part of a preferred form of the invention installed thereon;

Figure 2 is a vertical sectional view taken axially through the change-speed driving and steering gear of Fig. 1;

Figure 3 is a diagram illustrating one form of hydraulic control system for controlling the transmission and propelling unit brakes illustrated in Figures 1 and 2;

Figure 4 is a side elevational view of one type of brake band and energizing motor suitable for employment in the present apparatus;

Figure 4a is a diagrammatic view of a change-speed transmission gearing through which power is transmittable at different speeds from the engine to the change-speed driving and steering gear shown in Figure 2;

Figure 4b is a modified form of valve utilizable in the control system of Figure 3;

Figure 5 is a diagrammatic view illustrating the modified form of hydraulic control system adapted to diminish the pressure applied to the brake actuating motors between which a shaft is being made for changing individually applied brakes; and Figure 6 is a schematic view showing the coordinated positions of the regulating means for the admittance valves and exhaust valves for the brake motors, and for a pressure regulating valve interposed between the source of fluid pressure and the motors.

The tractor 10 of Figure 1 has an engine E mounted upon the forward portion of its frame and a frame housing H comprising the rear portion of the tractor body for containing the change-speed transmission unit shown in Figure 2. At opposite sides of the tractor are the conventional endless treads, or tracks, TL and TR which are respectively at the left-hand and right-hand sides of the tractor. It should be understood, however, that the present invention is equally pertinent to vehicles employing any type of traction ground supports of which the relative speed is controlled for steering the vehicle. One type of vehicle employing non-steerable wheels of which the relative speed is changed for steering the vehicle is shown in U. S. Patent No. 1,446,121. The left-hand track TL is driven by spur gears and a chain sprocket (not shown) which receive driving force from a shaft SL. A similar driving connection exists between a shaft SR and the right-hand track TR. This driving connection between the shafts SL and SR, and the endless tracks, may be of the character illustrated in a copending application of David B. Baker et al. Serial No. 542,146, filed June 26, 1944, for Frame and drawbar structure for crawler tractor, which has become Patent No. 2,391,002, December 18, 1946.

In Figure 4a, there is shown a change-speed transmission gearing somewhat diagrammatically within a gear box GB of which the outline is represented by dot-dash lines. The drive shaft 1 of this transmission has an internal splined connection at 2 with a power take-off shaft 3 arranged coaxially with the shaft 1. The shaft 1 receives driving force from the vehicle engine E through a conventional manually releasable clutch (not shown). Power take-off shaft 3 has a splined shaft 4 journaled thereon, and this splined shaft has a plurality of gears G constrained for rotation therewith but slidable lengthwise thereof. Certain of the gears G are meshable with certain gears G' constrained for rotation with a counter-shaft 5. Certain other of the gears G are connectable indirectly with certain of the gears G' through idler gears (not shown) to obtain reverse drive of the driven shaft 11. Rotation of the splined shaft 4 occurs when gear 6 is slid to the right as viewed in Figure 4a for meshing the teeth of an internal jaw clutch 7 thereon with end portions of the teeth on a gear 8 formed integrally with the shaft 1. Power take-off shaft 3, however, is always constrained for rotation with the shaft 1 irrespective of whether a drive connection is established between any of the gears on the splined shaft 4 and the gears on counter-shaft 5.

Referring now to Figure 2, the transmission there shown is a symmetrical arrangement wherein there are two virtually identical change-speed portions which, since they are independently driven, though complementary, may be regarded as separate change-speed transmission units. One of these change-speed portions is arranged about the shaft SL, while the other of such portions is arranged about the shaft SR. Driving force for the unit is received from the shaft 11 carrying a pinion 12 in a manner constrained for rotation therewith. This pinion 12 meshes with a ring gear 13 which is fastened by capscrews 14, spaced circumferentially thereabout, to a fabricated drum-like planetary gear carrier structure 15.

A frusto-conical extension 19 of the carrier 15 extends to the left, as viewed in Figure 2, where it is mounted within the inner race of a tapered roller bearing unit 22 and the outer race of this bearing unit is mounted within a ring 23, which in turn is mounted within an opening 24 within a boss 25 of the frame housing H. A corresponding frusto-conical member 31 projects to the right from the enlarged central portion of the carrier 15. The outer end of this frusto-conical member 31 is mounted in a boss 32 of the housing H through the agency of a ring 33 and a tapered roller bearing unit 34.

Referring now to the right-hand portion of Figure 2, the inner end of the track driving shaft SR has a sun gear 35 splined thereto at 36. An axially extending hub portion 37 of the sun gear is journaled within a bearing 38 within the carrier 15 for maintaining a coaxial relation of said sun gear, the shaft and the carrier. Additional sun gears 41 and 42 coaxial with the gear 35 are spaced axially outwardly therefrom. The larger diameter of these two additional gears is formed integrally with a sleeve shaft 43 which is journaled within the outer end of the carrier structure 15 and which carries a brake drum 44 having its hub secured thereto by circumferentially spaced bolts 45. The smaller sun gear 41 is formed integrally with a sleeve shaft 46 journaled within the sleeve shaft 43 and having the hub of the brake drum 47 secured thereto by circumferentially spaced bolts 48. A third brake drum, 49, has its hub splined to the track driving shaft SR at the splined section 51.

The three sun gears 35, 41, and 42 mesh respectively with the three gears 52, 53, and 54 of each of three gear clusters 55 (one being shown) journaled within and spaced circumferentially about the carrier structure 15. The inner end of each gear cluster is journaled within a ball bearing unit 56 carried within a hole 57 in the annular member 26 of the carrier structure, whereas the outer end of each of these three gear clusters is journaled within a ball bearing unit 58 reposing within an opening 59 formed within a radial boss portion 61 of the frusto-conical extension 31. An opening 62 within each boss portion of the frusto-conical part 31 permits the gear 53 of the associated gear cluster to project outwardly of the carrier.

During rotation of the carrier structure 15, by means of driving force received by the pinion 12 and the bevel pinion 13, should a brake band LR be applied to the brake drum 44 to prevent rotation of this brake drum and consequently prevent rotation of the gear 42, the planet gear clusters 55 will function to impart rotation to the sun gear 35 and to the track driving shaft SR at a definite speed ratio with respect to the speed rotation of the carrier and in the same direction that this carrier is rotated. Assuming the gear 42 is stationary while the gear clusters 55 are revolved pursuant to rotation of the carrier, the gears 54 meshing with the stationary gear 42 will be caused to roll about said gear 42 while causing the gear clusters to rotate about their individual axes. This rotation of the gear clusters about their individual axes will be in the direction tending to impart rotation to the sun gear 35 in the direction opposite to that in which said clusters are being planeted or revolved. Since, however, the gears 52 are smaller in diameter than the gears 54, the peripheral speed of the gears 52 will be less than their planeting or revolving speed, wherefore, a net speed of the gears 52, circumferentially of the sun gear 35 at the points of contact between the teeth of the gears 52 and 35, will be in the direction the carrier structure is rotated but at a reduced speed. Thus, the gear 35 and the shaft SR, when the brake band LR is applied, will be caused to rotate in the same direction as the planet gear carrier but at a reduced speed with respect thereto.

A somewhat higher speed of the shaft SR can be obtained in the same direction as the carrier, but also at a reduced speed with respect to carrier rotating speed by applying a brake drum HR to the brake drum 47. In this manner, the brake drum 47 is held against rotation while the brake drums 44 and 49 are free to rotate. When the brake drum 47 is held against rotation, the smaller diameter gear 41 is also held against rotation. Since the gear 41 has a smaller tooth pitch-line diameter with respect to the gear 53 than has the gear 42 with respect to the gear 54, the non-rotating gear 41 will cause the revolving gear clusters to rotate at a slower speed about their individual axes with the net result that the cluster gears 52 will carry the sun gear 35 at a higher speed in the direction of the carrier rotation.

Under certain operating conditions which will become hereinafter apparent, it is desirable to hold the shaft SR against rotation while neither of the brake bands LR or HR is applied for causing the transmission of driving force to said shaft SR. Such holding of the shaft SR against rotation is accomplished by applying a brake band BR to the drum 49. Each brake 44—LR, 47—HR and 49—BR constitutes a torque-exerting device and these devices are operable when the counterparts thereof are constrained against relative rotation to exert a torsional force through the sleeve shafts 43 or 46 or through the shaft SR to modify the power transmitting speed or character of the associated gearing. There is a set of these torque-exerting devices at each end of the gearing arrangement shown in Figure 2.

Inasmuch as the gearing, brake drums and brake bands, assembled about the left-hand shaft SL, contain parts respectively corresponding to and operating identically with the gearing, brake drums and brake bands, just described in association with shaft SR, these corresponding parts have been identified by the same reference characters excepting for the addition of the letter "L," or the substitution of the letter "L" for the letter "R."

In Figure 4, a suitable brake and actuating motor therefor is shown for constraining rotation of the brake drums. The brake band LL, which is illustrated in Figure 4, is an articulated structure comprising three pivotally connected arcuate brake shoes S¹, S², and S³. One end of the shoe S¹ is pivotally connected with one end of a link 201 which has its other end connected to a fixed arm 202 by a pivot pin 203. Arm 202 is fixedly mounted upon the frame housing H in any suitable manner. The free end of the brake shoe S³ pivotally carries a pin 204 having a transverse hole 205 through which there extends a threaded rod 206. This rod 206 extends slidably through a spring reaction washer 207 and a pivotal member 208 into rigid connection with a bifurcated head 209 which is pivotally connected to an intermediate section of a bell-crank lever 211 by a pin 212. A spring 213 compressed between the washer 207 and the free end of the shoe S³ normally holds the brake band in an expanded relation to the drum 44L, the amount of clearance between the brake band and thus drum being determined by an elongated cap-nut 214 screwed to the threaded end of the stem 206. Application of the brake band to the brake drum is obtained by rotating the bell-crank 211 counter-clockwise about the fixed pin 203, whereby the stem 206 is moved axially through the members 207 and 208 incident to drawing the free end of the shoe S³ toward the anchored end of the shoe S¹. This counter-clockwise movement of the bell-crank 211 is incurred by introducing fluid under pressure into the right end of the cylinder 215 of a fluid actuated brake motor MLL through a conduit 216. The cylinder 215 is secured to the frame housing H by any standard means, so that the fluid introduced into the cylinder to the right of the motor piston 217 will force this piston, its piston rod 218, and a connecting rod 219 to the left, turning the bell-crank 211 counter-clockwise with the effect just described. When the pressure of fluid introduced to the conduit 216 is sufficiently diminished, the spring 213 will release the brake band incident to imparting clockwise rotation to the bell-crank 211 about the pivot 203. A conduit 221 serves to catch any fluid which leaks past the piston 217 in the motor cylinder for return of this fluid to a reservoir RV shown in Figure 3.

All of the brake bands may be constructed similarly to the brake band LL, and, likewise, other motors for the respective application of these brake bands may be constructed, arranged, and connected with their brake bands similarly to the arrangement of the motor MLL with respect to its brake band LL.

Brake actuating motors MBL and MHL, corresponding to the motor MLL are respectively associated with the brake bands BL and HL similarly to the association of the motor MLL with the brake band LL, so that, when fluid under pressure is supplied to these motors MBL and MHL, they will cause application of their brake bands BL and HL to their mated brake drums for holding the latter against rotation. On the right side of the tractor, brake motors MLR, MHR, and MBR, corresponding to the motor MLL, are disposed in operating relation respectively with the brake bands LR, HR, and BR for similar application of these brake bands when fluid is supplied to these motors under pressure. The supply of fluid under pressure to the various motors and the exhausting of the fluid from the motors when it is desired to release the brakes is controlled by a pair of valves VL and VR which are controlled by a pair of hand levers XL and XR. Each of these levers XL and XR is movable between positions B, L, and H. When the lever XL is in the position shown (position L), its associated valve VL will be adjusted for imposing pressure fluid upon the motor MLL to cause brake applying energization of the motor MLL, whereby the brake band LL is applied and the left-hand component of the gearing, illustrated in Figure 2, is conditioned for transmitting drive to the left-hand track TL at the low speed. Movement of the lever XL into its position H will cause deenergization of the motor MLL to disestablish connection of the low speed train and to cause energization of the motor MHL, whereby the brake band HL is applied for establishing the high speed power train which drives the left-hand track TL. When the lever XL is placed in the position B, both of the motors MLL and MHL will be deenergized while the motor MBL is energized to apply the brake band BL whereby the track TL will be constrained against propelling movement.

Lever XR controls the valve VR when the lever is moved into its positions B, L, and H to cause individual energization of the right-hand motors MBR, MLR, and MHR, respectively, as just explained with respect to the left-hand lever XL and the left-hand motors.

The hydraulic system for supplying fluid under pressure for actuating the various brake applying motors includes a pump P which is constantly driven. Fluid for the intake side of the pump, which is constantly driven, is obtained through a conduit 225 from the reservoir RV and is introduced into a pressure regulating assembly PRR through a conduit 227. Fluid at a substantial constant pressure is caused to be impressed from the assembly PRR, through a conduit 228 and conduits 229 and 231, onto the inlet ports 232L and 232R of the valves VL and VR.

Rotary valve VL has a casing 233L, which in addition to the inlet port 232L has outlet ports 234L, 235L, 236L, 237L, and 238L. A rotor 239L has a channel 241L which communicates with the inlet port 232L, at all times, and which is oscillative between positions corresponding to the positions B, L, and H of the lever XL (in view of the connection of the lever with the rotor through a link 242L and an arm 243L which is constrained for rotation with the rotor), wherein the channel respectively communicates with the outlet ports 237L, 236L, and 235L. When the channel 241L communicates with the port 236L, as shown in Figure 3, fluid under pressure will be delivered from the pressure regulator and impressed through the conduit 216 for actuating the motor MLL. When the lever XL is moved to position B, the channel 241L will register with the port 237L and deliver pressure fluid through a conduit 244 for energizing the brake motor MBL and, when the lever XL is in the position H, the channel 241L will register with the port 235L to impress fluid to the conduit 245 for energizing the brake motor MHL. While the channel 241L registers with the port 236L, cavities 246L and 247L establish communication of the conduits 245 and 244 with the low pressure reservoir conduit 248L respectively through ports 234L and 238L and conduits 249L and 251L. This results in the motors MHL and MBL being exhausted or non-actuated, whereby the brake band LL will be individually applied with respect to the brake bands BL and HL. While the rotor 239L is in the high speed position with the channel 241L in registry with the port 235L, the rotor cavity 247L will establish communication of the ports 236L and 237L with the reservoir, whereby the brake bands LL and BL will be disengaged. Disposal of the rotor in the braking position with the channel 241L, registered wtih the port 237L, will cause individual application of the brake band BL, while the rotor cavity 246L establishes communication of the ports 235L and 236L with the low pressure reservoir through the conduit 249L, exhausting the motors MHL and MLL.

A similar individual energization of the right-hand motors MLR, MHR, and MBR is possible by manipulation of the valve VR and the associated conduits, the parts of this valve and the associated conduits which correspond to those already described with respect to the valve VL and its conduits are designated by the same respective reference characters but incorporating the letter "R" instead of the letter "L," or adding an "L" where no letter is incorporated in the corresponding reference character for designating conduits associated with the valve VL. Breather and leakage disposal conduits 252 and 253 are connected between the motors MHL and MBL and the reservoir to serve similarly to the conduit 221 with respect to the motor MLL.

Excepting when motor actuating fluid is being delivered to one of the brake actuating motors through the conduit 228, a check valve 261 traps the fluid within the conduit 228 at a high pressure while the pump is allowed to by-pass at low pressure through a by-pass-valve 262. This is possible because of the action of a control valve 263 which, when subjected to a predetermined minimum pressure through a conduit 264, utilizes the pressure of the fluid reaching a chamber 265 through the conduit 264 for forcing a plunger 266 to the right against the effort of a spring 267. When the plunger 266 is moved to the right, it moves a valve member 268 from its seat 269, permitting the escape of fluid from a chamber 271 of the by-pass-valve 262 through a conduit 272, holes 273 in the valve member 268, and conduits 274 and 275 back to the reservoir. This escape of fluid from the chamber 271 takes place because the flow capacity through the conduit 272 and the control valve to the reservoir is greater than the flow capacity of a restricted passage device 276 in a conduit 277 communicating between the pump delivery conduit 227 and the chamber 271. With the discharge of fluid through the conduit 272 a wafer piston 278 in the by-pass-valve 262 is allowed to move to the left for releasing a spring 279 and thus permitting a valve member 281 to move to the left under the influence of pressure of fluid in a conduit 282. Movement of the member 281 to the left away from the valve seat 283 conditions the valve 262 in the by-pass condition so that the entire output of the pump can discharge at low pressure through the conduits 227 and 282, openings 284 in the valve member 281 and conduits 285, 274, and 275 to the reservoir for recirculation to the pump through the conduit 225. Meanwhile, the check valve 261 maintains the high pressure in the conduit 228 and, hence, upon any of the brake actuating motors communicating with this conduit through either of the valves VL and/or VR.

Upon reduction of pressure in the conduit 228, because of introduction of fluid into any of the brake actuating motors, the control valve plunger 266 will be permitted to move to the left for reseating the control valve member 268, whereby the fluid flow from the pump through the restricted passage 276 will be forced into the by-pass-valve chamber 271 for moving the piston 278 to the right and compressing the spring 279 sufficiently for seating the valve member 281 and forcing the fluid delivered by the pump through the check valve 261. A pressure relief valve 285$^a$ opens to permit delivery from the conduit 227 directly to the reservoir through the conduit 275 only in the event of an excessive pressure being accidentally incurred in the apparatus.

The gearing in compartment GB, as explained above, is capable of driving the shaft 11, either forwardly or rearwardly at different speeds, and it follows that the tracks TL and TR may be driven at twice the number of speeds in the forward direction as the shaft 11 can be driven forwardly by power trains of the gearing in the compartment G and, likewise, the tracks TL and TR can be driven at twice the number of speeds rearwardly as the transmission gearing in G is capable of driving the shaft 11 in the reverse direction.

Assuming the gearing in the transmission compartment G is to be set for forward driving of the shaft 11 and both of the control levers XL and XR to be in the position shown, at L, the vehicle will be driven forwardly in a straight course and at the slower of two instantaneously selectable speeds. Should it be desired to increase the speed of the vehicle upon this straight course, both of the levers XL and XR will be pushed forwardly simultaneously into the positions H, thereby disconnecting the two low speed trains in the transmission of Figure 2 and establishing the higher speed trains. Irrespective of the speed at which the gearing in the compartment G is set, the speed of the tracks TL and TR can be instantaneously changed by shifting between the high and low speed of the transmission gearing in Figure 2.

Steering of the vehicle is accomplished by independent manipulation of the levers XL and XR to place them in different speed positions or in the braking position B. Assuming the levers XL and XR to be in low positions, illustrated in Figure 1, turning to the left can be accomplished in one of two ways. First, by pulling the lever XL rearwardly into position B while the lever XR is left in the position L. This will cause braking of the left-hand track TL while the track TR continues rotating forwardly at the lowest speed. This will cause the vehicle to make a pivot turn about a vertical axis substantially intersecting a mid-portion of the track TL. Secondly, while the levers XL and XR are in the positions L, a turn to the left may be executed by pushing the lever XR forwardly into the position H while leaving the lever XL at its position L. This maneuver will leave the track TL running forwardly at the low speed, but will cause the track TR to increase its speed, whereby the turn to the left instead of being a pivot turn, as in the first described instance, will be a turn upon an arc about a point to the left in the tractor.

While the lever XL is in any of its positions B, L, and H, the lever XR may be concurrently placed in any of its positions B, L, and H or vice-versa. Consequently, while the tractor is turning to the left upon the fixed arc with the lever XL in the position L and the lever XR in the position H, the lever XL could be moved rearwardly into position B for causing the vehicle to commence a pivot turn about a vertical axis in the track TL, or, the lever could be moved forwardly into the position H for causing the vehicle to depart from the arcuate path and move in a straight path at the higher of the two speeds attainable through the transmission shown in Figure 2.

Similar maneuvers can be obtained when the vehicle is to be turned to the right. While the lever XR is in the position B, the lever XL can also be placed in position B, whereby brakes will be applied to both of the tracks TL and TR. This condition is sometimes desirable when the vehicle is proceeding down-hill with a non-braked load trailing behind. While both levers are in the position B, lever XL may be moved forwardly into position L, causing the left track TL to move forwardly at the slow speed, while the right track is braked against propelling movement and the vehicle is thus caused to pivot about a vertical axis intersecting the track TR. Movement of the lever XL into the position H will cause the same character of pivotal turn about the vertical axis intersecting the track TR but at greater speed. While the right lever XR is at its position L, turning to the right about an axis spaced to the right from the track TR can be obtained by moving the lever XL into the high speed position H for the track TL.

In this description of the effect of applying the various steering brakes, it has been assumed that the vehicle has been operating with the transmission gearing in the compartment G set in a forward speed. Similar manipulations of the levers XL and XR can be utilized for steering and turning the vehicle when it is connected through the transmission in compartment G for driving in a rearward direction.

Disassociation of driving connections with the tracks TL and TR is obtainable by applying both brake bands BL and BR incident to moving the levers XL and XR into their positions B. This disestablishes both of the power transmitting trains in the steering transmission of Figure 2 incident to applying the brakes. Disconnection between the tractor engine and the tracks TR and TL is also possible by the disconnection of the main clutch (not shown) between the engine and the gearing in the compartment G.

In addition to the brake bands BL and BR being controlled by the energized motors MBL and MBR, these brake bands are also controllable in an emergency by brake pedals PL and PR. Pedal PL is connected by a link 71, one arm 72 of a rock-shaft 73, and a second arm 74 of this rock-shaft is connected with a link 75 which connects with a piston (not shown) in the motor MBL. Depression of the pedal PL is operable through the just described linkage for moving the piston of the motor MBL and applying the brake band BL independently of fluid pressure supplied to the motor MBL. A corresponding linkage is disposed between the pedal PR and the piston in the motor MBR, such linkage including a link 76, a rock-shaft arm 77, rock-shaft 78, a rock-shaft arm 79, and a piston-connecting link 81. Normally, the brakes controlled by the pedals PL and PR will be engaged by means of these pedals only in an emergency as where the fluid system should fail while the vehicle is proceeding up or down a steep incline.

An important advantage of the present steering and driving apparatus is its uniformity of manipulation for obtaining corresponding vehicle maneuvers, irrespective of whether the vehicle is proceeding up-hill or down-hill, or on a level course. In conventionally used driving and steering gears upon the crawler tractors, turning of the vehicle in one direction is brought about by disconnecting the power connection between one of the tracks and the vehicle engine. The turn normally is made toward the side of the vehicle at which the track is disposed which has its driving force interrupted. When proceeding down-hill with a load tending to push the vehicle, instead of the vehicle tending to pull the load, such release of the power train at one side of the vehicle will result in the tendency to turn the vehicle in the opposite direction because of the load tending to push the released track at greater speed than the track remaining connected with the engine which serves as a brake therefor. By employing change speed steering gear of the present kind, turns to the right or to the left while proceeding down-hill can be effected by concurrently establishing power trains of different speed ratio respectively between the tracks and the vehicle engine, whereby the engine will continue to serve as a brake for the tracks while permitting them to rotate at different speeds. The relative rotating speeds of the tracks under these conditions is the same as under pulling conditions, wherefore, the tractor operator is not confronted with the potentiality of becoming confused by reversed steering conditions during precarious down-hill steering.

By substituting a valve structure of the type illustrated in Figure 4b for the valves VL and VR in Figure 3, a definite neutral position is had for the control levers XL and XR between their positions B and L. Various ports and channels in the valve VM correspond respectively to those in the valves VR and VL, and these respective parts are designated by the same reference numerals followed by the letters M instead of the letters L or R. The only difference in the construction of the valve VM and the valves VL and VR is in the formation of the port 237M which is formed without the extension projecting circumferentially of the casing at its inner periphery toward the port 236M. The omission of this extension at the inner end of the port 237M leaves a definite space between the ports 236M and 237M for the registration of the rotor channel 241M without this channel communicating with either of the ports 236M or 237M so that none of the brakes as LR, HR, or BR will be engaged. This neutral position of the valve rotor illustrated in Figure 4b will be incurred when the associated operating lever XL or XR is moved into a neutral position between the positions B and L.

By equipping the hydraulic control system of Figure 3 with right and left-hand valves constructed like the valve VM, when the associated lever as XR is placed in the neutral positions between B and L so that none of the associated brakes RL, XR, or BR is engaged, the other of the levers as XL may be placed in the L or H position for causing the transmission of power to the track on the opposite side of the vehicle, and since at this time the other track will be neither braked nor driven, the vehicle will be caused to turn on a radius exceeding that at which it would turn if the undriven track were braked and at a radius less than at which the vehicle would turn if the unbraked track were driven at the low speed while the driven track were driven at the high speed. Therefore, the use of valves as VM increases the number of possible turning radii of the vehicle while the constantly running power connection illustrated in Figure 4a makes it possible to transmit an operative drive to auxiliary equipment, such as power actuated scrapers, receiving power from the vehicle while the latter is driven forwardly or turned at any of the possible radii. Also the power take-off through the power take-off connection in Figure 4 makes it possible to transmit operating power to the auxiliary equipment while the vehicle is at rest and while each of its control levers XL and XR is in the braking position B.

In Figures 5 and 6, a modified form of fluid control system is illustrated for the brake motors. The same brakes and brake motors are illustrated in Figure 5 as in the lower numbered figures, and the same pressure regulating apparatus PRR is also employed.

This modified hydraulic control system differs functionally from that above described in the respect that it causes concurrent partial or yieldable engagement of brake bands between which a shift in utilization is being made. The concurrent engagement of these brake bands is accomplished by establishing concurrent communication between the actuating means for these brake bands and the source of fluid pressure, and the partial or yieldable application of these brake bands to their brake drums is accomplished by a concurrent diminution of the pressure in the fluid imposed upon the motors. The purpose of this mode of operation is to insure against there being an interval during the execution of a change from one brake to another when the vehicle propelling units, as TL or TR, will be isolated from either a braking or a driving connection. Consequently, there will be no period when any propelling unit is released from supervised control. The propelling units are, therefore, caused to respond uniformly and precisely to controlling manipulations of the hand levers XL and XR.

The selective operation of the left-hand brake actuating motors MBL, MHL, and MLL is controlled through a valve means 301. A valve casing 302 contains three spring pressed valve balls BB, BH, and BL, normally maintained against their cooperating seats in the position of which the balls BB and BH are illustrated. A chamber 303 is contained in the casing on one side of the seats for the balls as BB, and individual chambers 304, 305, and 306 are adapted to be isolated from the chamber 303 when their respectively associated balls are seated. These chambers 304, 305, and 306 communicate with the motors MBL, MHL, and MLL through conduits 307, 308, and 309. Fluid under pressure is supplied to the chamber 303 from the pressure regulator PR through the conduit 228, a check valve 261L constructed similarly to the check valve 261, a conduit 311, a chamber 312 in a pressure regulator device 313, and a conduit 314. This fluid under pressure is imposed upon the motors MBL, MHL, and MLL selectively by the unseating of the valve balls as BB. Balls BB, BH, and BL are unseatable by endwise thrust applied through valve stems 315, 316, and 317 which are actuated by cams 318, 319, and 320. These cams are constrained for rotation with a cam shaft 321 and have respective lobes 322, 323, and 324 spaced apart 90° circumferentially of the shaft as illustrated in Figure 6. Cam shaft 321 has a pinion 325 affixed thereto and meshed with a rack 326 which is movable endwise by the link 242L incident to the movement of the control lever XL between its settable positions.

Cam shaft 321 also extends through the casing 327 of an exhaust valve EXL containing a segmental rotor 328, of Figure 6, which is fixed for rotation with said shaft. There are ports HP, LP, BP, and EXP spaced 90° about the casing as illustrated in Figure 6. These ports are closable by the rotor 328 when any part of its curved surface 329 is in covering relation therewith. Port EXP is communicative with the reservoir RV through the conduits 331 and 332. Ports HP, LP, and BP are respectively communicatively connected with the valve casing chambers 305, 306, and 304 by conduits 333, 334, and 335. The circumferential relation of the admittance-valve-actuating cam lobes 322, 323, and 324 and of the exhaust valve ports EXP, HP, LP, and BP, and of the exhaust valve rotor 328, is such that when any of said lobes is in centered registry with its valve stem, as 317, for unseating its ball, as BL, for imposing actuating fluid upon its associated motor, as MLL, the other lobes will be removed from their valve stems to close their associated admittance valves and the proper ports HP, LP, or BP will be opened to permit exhaust of fluid from the other two motors so they will be deenergized, this exhausting of the motors being through the proper tube of these ports HP, LP, and BP and the port EXP to the reservoir through the conduits 331 and 332.

The pressure regulating device 313 comprises a cylinder 341 with a by-pass side wall opening 342 which is normally covered by a cup-like piston 343, which is yieldably held in the position shown by a compression spring 344, which reacts against an axially adjustable member 345. Axial adjustment of the spring reaction member 345 is obtained by a cam 346 acting through a stem 347. Cam 346, which is fixed for rotation with the shaft 321, has three cam lobes HC, LC, and BC circumferentially spaced, as shown in Figure 6. When any of these lobes is in centered registry with the stem 347, the reaction member 345 will be disposed in its left-most position, compressing the spring 344 sufficiently so that the maximum pressure of the fluid admittable into the line 311 and the pressure regulator chamber 312 will be insufficient for moving the piston 343 for uncovering the port 342. When, however, the cam 346 is rotated to dispose none of the cam lobes in registry with the stem 347, the reaction member 345 will be allowed to move to the right for somewhat relaxing the spring, whereby a diminished pressure within the chamber 312 will be sufficient for moving the valve piston 343 into at least a partial uncovering relation of the by-pass port 342. This diminishes the pressure imposable through the conduit 314 and the valve casing 302 onto any one or more brake motors communicative with the valve casing chamber 303. The phase relation of the cam 346, rotor 328, and the cams 318, 319, and 320 upon the shafts 321, to which all of them are fixed, is as illustrated in Figure 6.

With the control lever XL in the position shown in Figure 5, the various movable parts of the apparatus will be as illustrated in Figures 5 and 6. The brake band LL will be applied to the transmission brake drum 44L of Figure 2 at its full rated pressure for establishing the low speed power train in driving relation with the track TL. Both of the check valves 261 and 261L will be closed and the fluid trapped in the line 311 at high pressure is impressed upon the brake motor MLL through the pressure regulating device 312, conduit 314, valve casing chamber 303, past unseated ball BL and through chamber 306 and the conduit 309. Exhaust conduit 334 is then closed at the exhaust valve port LP of the exhaust valve EXL. None of the fluid at high pressure in the valve chamber 303 can pass the seated valve balls BB and BH for reaching the chambers 304 and 305. These chambers 304 and 305 and, consequently, the motors MBL and MHL are communicative with the low pressure reservoir through the exhaust conduits 335 and 333, exhaust valve casing 327, exhaust port EXP, and the conduits 331 and 332.

Pursuant to a shift of the lever XL from position L to position H for disestablishing the low speed power train connection and establishing the high speed power train connection, the rack 326 will be moved rearwardly for rotating the cam shaft 321 counter-clockwise as viewed in Figure 6. As the cam 346, exhaust valve rotor 328, and the admittance valve cams 318, 319, and 320 rotate counter-clockwise, the pressure regulating cam lobe LC will be withdrawn from registry with the valve stem 347 to permit retraction of the valve piston 343 for diminishing the fluid pressure in the chamber 312. At this phase in the operation of the device, the fluid escaping through the port 342 of the auxiliary pressure regulating device 313 will flow back to the low pressure reservoir through conduits 350 and 332. Exhaust port HP is closed by the exhaust valve rotor 328 at about the time the stem 347 arrives at the foot of the lobe LC onto the short radius profile portion LH of the pressure regulator control cam 346. At about this same time, the lobe 324 on the cam 320 will carry its inclined face 351 along the valve stem 317, causing the valve ball BL to commence seating and this ball will be seated for preventing admittance of fluid into the low speed motor MLL subsequent to the closing of the exhaust port HP for the high speed motor MHL. Subsequently, while the short radius profile portion LH is traveling along the valve stem 347, causing a reduction of pressure in the chamber 312, this reduced pressure having been communicative with the low speed motor MLL past the admittance valve ball BL, prior to the descension of the valve stem 317 to the foot of the inclined profile 351, the incline 352 on the cam lobe 323 will come in registry with the valve stem 316 and commence unseating of the admittance valve ball BH for the high speed motor MHL. At this time both of the motors MHL and MLL will be energized at the reduced pressure in the pressure control valve chamber 312. This concurrent low pressure energization of the motors MLL and MHL is of short duration, for the edge 353 of the exhaust valve rotor 328 will at that time commence uncovering the exhaust port LP for the low speed motor MLL. Upon completing this low pressure energization of the high speed motor by the admittance valve ball BH being open or unseated, the inclined portion of the pressure regulating cam lobe HC will commence to pass under the stem 347 for moving the plunger 343 to the left to stop the escape of fluid through the port 342, and thereby reestablish the condition of high pressure in the chamber 342. Thus, the uncovering of the exhaust port LP causes the low speed motor to become completely deenergized for releasing the partially established low speed train, whereas the inclined portion of the pressure regulator cam lobe HC causes the application of full pressure upon the high speed motor MHL to fully energize this motor and to completely establish the partially established high speed power train.

Upon a shift from the high speed train back to the low speed train, there is a reversal of the above recited sequences. First, the lobe HC will be withdrawn from registry with the stem 347, diminishing the pressure within the chamber 312, and, consequently, the pressure upon the high speed motor MHL causing the grip of the brake band HL to be such as to allow slippage at lower loads. The exhaust valve of the port LP of the low speed motor MLL is next to close as the edge 353 of the exhaust valve rotor 328 passes clockwise, as viewed in Figure 6, past the port LP. Subsequent to the reduction of pressure in the high speed motor MHL, as the short radius profile LH traverses the stem 347, the incline 352 of the cam lobe 323 will pass from beneath the valve stem 316 to permit seating of the high speed admittance valve ball BH. Next, the incline 351 of the low speed cam lobe 324 will pass under the valve stem 317 to open the low speed admittance valve which includes the ball BL, and thereby cause concurrent low pressure energization of the low speed and high speed motors. Following this, the then trailing edge 354 will uncover the exhaust port HP for the high speed motor to completely deenergize the same and thereafter the pressure regulator stem 347 ascends the cam lobe LC for reestablishing the high pressure condition in the chamber 312 and upon the low speed motor MLL.

In executing a shift from the low speed connection to the application of the propelling structure brake including the brake band BL, the lever XL will be moved rearwardly to cause clockwise pivoting of the shaft 321 as viewed in Figure 6. First, the cam lobe LC will be moved from registry with the valve stem 347 to reduce the pressure in the chamber 312 and thus partially energize the low speed motor. The then leading edge 353 of the exhaust valve rotor 328 will cover the exhaust port BP for the brake motor MBL, during this low pressure condition while the short radius profile LB traverses the stem 347, and the inclined portion 355 of the admission valve cam lobe 324 will pass under the valve stem 317, seating the valve ball BL, and thus terminating communication of the low pressure energized low speed motor with the source of fluid under pressure. Next, the incline 356 of the admittance valve lobe 322 will pass under the valve stem 315 to unseat the admittance valve ball BB and cause energization of the motor MBL at the low pressure, then existing in the chamber 312 for partially applying the brake band BL. Subsequent to this partial engagement of the brake band BL, the then trailing edge 354 of the exhaust valve rotor will uncover the exhaust port LP for the low speed motor, deenergizing this motor, and the lobe BC of the pressure regulator cam 346 will have its incline 357 traverse the end of the stem 347 for reestablishing the high pressure condition for energizing the brake motor.

A shift from the condition in which the brake band BL is firmly engaged to the low speed connection will move the lever XL back from position B to position L, incident to rotating the shaft 321 counter-clockwise as viewed in Figure 6. The pressure regulating valve stem 347 will then first descend the incline 357, causing low pressure energization of the brake motor. The exhaust valve port LP for the low speed motor is then closed and the admittance valve for the brake motor is closed by the incline 356 of the admittance valve lobe 322 passing from beneath the valve stem 315. Next, the incline 355 of the low speed admittance valve lobe 324 passes under the valve stem 317, unseating the ball BL and thereby incurring concurrent partial energization of the motors MBL and MLL by the low pressure fluid in the chamber 312. The then trailing edge 353 of the exhaust valve rotor 328 opens the exhaust port BP for the brake motor completely releasing the brake band BL, and the low speed lobe LC on the pressure regulator cam 346 then carries its incline under the stem 347 for reestablishing the high pressure condition for the solely energized motor MLL.

A similar arrangement of pressure regulator valves and cams for the sequential control thereof is employed for the various brake bands LR, HR, and BR upon the right side of the vehicle, and the various parts of the control apparatus for the right side of the vehicle are indicated by the same reference characters, as the parts above described, but with the substitution of the letter "R" for the letter "L," and the addition of the letter "R" where no letter is employed in the reference character designating the corresponding part in the above described system for the left side of the vehicle.

Separate check valves 261L and 261R are employed for the feed lines 311 and 311R, so that the pressure regulator 313 or 313R of either can be manipulated to cause reduction of pressure in either of the conduits 311 or 311R without affecting the pressure within the other. In other words, for example, the pressure in the chamber 312 of the regulator 313 can be diminished to diminish the pressure on any of the motors MBL, MHL, or MLL, pursuant to the shifting from one of these motors to another without incurring diminution of pressure upon any of the motors on the right side of the vehicle which may be solely energized.

Having thus described the limited number of preferred forms of the invention, with the view of clearly illustrating the same, we claim:

1. In a tractor propelled by units at opposite sides, change-speed gearing components for respectively driving said propelling units, each gearing component comprising relatively low speed and high speed power trains for transmitting power in the same direction, sets of torque-exerting devices respectively associated with the gearing components, each device being associated with a respective power train of its gearing component and each being operable, when energized to resist relative rotation of counterparts thereof, to establish its power train in driving relation with its associated propelling unit, and a fluid system for incurring selected energization of said devices, said system comprising a source of fluid at non-atmospheric pressure, energizing means repectively for said devices and operable to energize the same pursuant to establishment of a status with respect to the existence or non-existence of communication between such devices and said source, said energizing means also being capable of partially energizing their respective devices, valve means settable for selectively establishing said communication status between said source and the energizing means, and means operable coordinately with changing the setting of said valve means to incur transitory concurrent partial energization of the devices between which a selection is being made.

2. In a tractor propelled by units at opposite sides, change-speed gearing components for respectively driving said propelling units, each gearing component comprising relatively low speed and high speed power trains for transmitting power in the same direction, sets of brakes respectively associated with each gearing component, each brake being associated with a respective power train of its gearing component and each being operable, when applied, to establish its power train in driving relation with its associated propelling unit, fluid actuated motors respectively for said brakes and operable to apply their brakes with a firmness constituting a function of the pressure of actuating fluid to which they are subjected, a source of motor actuating fluid, valve means respectively for each set of motors and operable to establish either individual or concurrent communication between the brakes of its set and the source, pressure regulating means adjustable to change the pressure of the fluid imposable from the source onto the motors, valve operating means manipulatable to change each valve means from a status of individual communication establishment between one of its motors and said source to a status of individual communication establishment between the other of its motors and said source incident to creating an interim of concurrent communication of the motors with said source, and means operable under control of said valve operating means to adjust the pressure regulating means for modifying the pressure imposable on the motors to diminish the available firmness of brake engagement during said interim.

3. In a tractor propelled by units at opposite sides, change-speed gearing having relatively high speed and low speed power trains establishable in driving relation with said units for driving them at the same or different speeds, each power train having an associated brake appliable to cause establishment thereof, fluid actuated motors respectively for said brakes and operable to apply their brakes with a firmness constituting a function of the pressure of actuating fluid to which they are subjected, a source of motor actuating fluid, valve means for controlling communication between the motors and the source, said valve means being operable to provide interchangeable communicattion between the source and certain of the motors exclusively of one another to shift power trains drivingly connected with the propelling units, said valve means also being operable to provide concurrent communication of the interchangeable motors with the source during the interim of interchange, pressure regulating means adjustable to change the pressure of the fluid imposable from the source onto the motors, valve operating means, and means operable coordinately with said valve operating means to adjust the pressure regulating means for modifying said pressure to diminish the available firmness of brake engagement during said interim.

4. In a driving assembly for use between the engine and the propelling means of a vehicle, a change-speed transmission having a plurality of power trains successively establishable in driving relation between the engine and the propelling means, said power trains including respective frictional gripping devices each having counterparts frictionally engageable under pressure to establish its associated train between the engine and propelling means, the frictionally engageable counterparts of said devices being slidable when subjected to a diminished pressure to facilitate a transitory concurrent partial establishment of said trains during a shift from one to another, fluid actuated motors for applying the pressure to said counterparts in an amount constituting a function of fluid pressure to which the motors are subjected, a source of pressure fluid, valve means operable to selectively individually subject the motors to the pressure of fluid from said source and to concurrently subject the motors to the pressure of such fluid during an interval of executing the selection, and pressure control means operable coordinately with said valve means to diminish the fluid pressure appliable to said motors during said interval.

5. In a driving assembly for use between the engine and the propelling means of a vehicle, a change-speed transmission having a plurality of power trains successively establishable in driving relation between the engine and the propelling means, each power train including a torque-exerting device energizable to resist relative rotation of counterparts thereof to establish its train between the engine and propelling means, said devices being capable of being energized in a diminished degree to decrease their resistance to relative rotation of their counterparts and thus facilitate a transitory concurrent partial establishment of the trains during a shift from the establishment of one to another, fluid actuated motors for energizing said devices to a degree constituting a function of the pressure to which the motors are subjected, a source of motor actuating fluid, valve means operable to selectively individually subject the motors to said fluid for actuation thereby and to concurrently subject the motors to said fluid during an interval of executing the selection, and fluid pressure control means operable coordinately with said valve means to vary the pressure of fluid imposed from said source onto the motors to diminish the degree of energization possible for said motors during said interval.

6. In a driving assembly for use between the engine and the propelling means of a vehicle, a change-speed transmission having a plurality of power trains successively establishable in driving relation between the engine and the propelling means, each power train including a torque-exerting device energizable to resist relative rotation of counterparts thereof to establish its train between the engine and propelling means, said devices being capable of being energized in a diminished degree to decrease their resistance to relative rotation of their counterparts and thus facilitate a transitory concurrent partial establishment of the trains during a shift from the establishment of one to another, fluid actuated motors for energizing said devices to a degree constituting a function of the pressure to which the motors are subjected, said motors serving to cause deenergization of their devices when subjected to an exhaust pressure of said fluid, a source of motor actuating fluid under pressure, admittance valve means operable to selectively establish individual communication between the motors and source and to incur concurrent communication of the source with motors between which a shift in selection is being made, means adjustable for varying the pressure of fluid imposable from the source through the admittance valve means onto the motors, exhaust valve means for the motors, and control means sequentially operable, in executing a shift from one power train to another, to adjust the pressure varying means for diminishing the pressure of the fluid imposed through the admittance valve means onto one of the motors, to actuate the exhaust valve means for closing the exhaust of the other motor, to actuate the admittance valve means for terminating communication between the source and the one motor and for creating communication between the source and the other motor, to actuate the exhaust valve means for opening the exhaust of the one motor, and ultimately to adjust the pressure varying means for increasing the pressure imposed through the admittance valve means onto the other motor.

7. In a change-speed and steering gear for a tractor steered by changing the relative speed of traction supports thereof, complemental change-speed transmissions for the respective drive of said traction supports, each transmission having relatively high speed and low speed power trains establishable in driving relation with their associated traction supports for driving the same in the same direction, each power train including a torque-exerting device energizable to resist relative rotation of counterparts thereof to establish its train in the aforesaid driving relation, said devices being capable of being energized in a diminished degree to decrease their resistance to relative rotation of their counterparts to thus facilitate a transitory concurrent partial establishment of the trains in each transmission during a shift from establishment of one to the establishment of the other, fluid actuated motors for energizing said devices to a degree constituting a function of the pressure to which the motors are subjected, a source of motor actuating fluid, valve means operable to selectively individually subject the motors of the devices associated with each traction support to said fluid for actuation thereby and to concurrently so subject the motors from and to which selection is made during the interval of executing the selection, independently manipulatable control members upon the tractor, one control member being associated with one transmission and manipulatable between positions for operating the valve means to respectively subject the power train motors of such transmission to the pressure of the fluid source, the other control member being associated with the other transmission and manipulatable between positions for operating the valve means to respectively subject the power train motors of such transmission to the pressure of the fluid source, and fluid pressure control means operable under control of each control member to diminish the pressure imposable from the source onto the motors controlled thereby during said manipulation between its positions.

8. In a change-speed and steering gear for a tractor steered by controlling the relative speed of traction supports thereof, brake devices respectively for said traction supports and each being energizable to resist relative rotation of counterparts thereof and thereby correspondingly brake propelling movement of the traction supports, complemental change-speed transmissions for the respective drive of said traction supports, each transmission having relatively high speed and low speed power trains establishable in driving relation with their associated traction supports for driving the same in the same direction, each power train including a torque-exerting device energizable to resist relative rotation of counterparts thereof to establish its train in the aforesaid driving relation, said devices being capable of being energized in a diminished degree to decrease their resistance to relative rotation of their counterparts to thus facilitate a transitory concurrent partial establishment of the trains in each transmission during a shift from establishment of one to the establishment of the other and to similarly facilitate a transitory concurrent partial establishment of each lower speed power train and partial braking of the associated brake device during a shift from the low speed train drive of its traction support to a braking of such support, fluid actuated motors respectively for the devices to energize the same to a degree constituting a function of the pressure to which the motors are subjected, a source of motor actuating fluid, valve means adjustable into settings to selectively individually subject the motors of the devices associated with each traction support to said fluid for actuation thereby and to concurrently so subject the motors from and to which a selection is being made during the interval of executing the selection, independently manipulatable control members manipulatable between advanced, retracted and intermediate positions, one of said control members being for the transmission and the brake device of one traction support and the other being for the other transmission and other brake device, each control member being operable to adjust the valve means to obtain subjection to the pressure fluid source of the high speed, the low speed, and the brake device motors of the transmission and brake devices respectively associated with such members upon their respective manipulation into the advanced, intermediate and retracted positions, and fluid pressure control means operable under control of each control member to diminish the pressure imposable from the source onto the motors controlled thereby during said manipulation between its positions.

WILLIAM O. BECHMAN.
DAVID B. BAKER.

REFERENCES CITED

The following references are of record in the file of this patent:

UNITED STATES PATENTS

| Number | Name | Date |
|---|---|---|
| 1,338,835 | Lake et al. | May 4, 1920 |
| 1,424,446 | Buckendale | Aug. 1, 1922 |
| 1,537,415 | Davis | May 12, 1925 |
| 2,088,110 | Lamb | July 27, 1937 |
| 2,088,427 | Maurer | July 27, 1937 |
| 2,159,983 | Colby | May 30, 1939 |
| 2,314,664 | Shenstone | Mar. 23, 1943 |
| 2,392,729 | Edge | Jan. 8, 1946 |